United States Patent [19]

Wrast et al.

[11] 4,231,826

[45] Nov. 4, 1980

[54] PROCESS FOR FORMING V-BELTS AND BELT SLEEVES

[75] Inventors: Richard E. Wrast, Nixa, Mo.; William J. Gardiner, Lakewood; Francis A. Shedd, Denver, both of Colo.

[73] Assignee: The Gates Rubber Company, Denver, Colo.

[21] Appl. No.: 972,291

[22] Filed: Dec. 22, 1978

[51] Int. Cl.³ .......................... B29H 7/22; F16G 5/06
[52] U.S. Cl. .................................... 156/138; 73/233; 156/139; 156/140; 156/142; 156/154
[58] Field of Search ............... 156/137, 138, 139, 140, 156/141, 142, 156, 153, 154, DIG. 45; 74/232, 233, 234, 237; 264/520, 531, 157, 162, 257, 258, 263

[56] References Cited

U.S. PATENT DOCUMENTS

| 2,669,280 | 2/1954 | Augustin | 156/140 |
| 3,416,383 | 12/1968 | Jensen et al. | 74/233 |
| 3,478,613 | 11/1969 | Waugh et al. | 74/233 |
| 3,822,516 | 7/1974 | Huber | 51/326 |
| 3,869,933 | 3/1975 | Dorf | 74/234 |
| 3,919,025 | 11/1975 | Ray | 74/232 |
| 3,948,113 | 4/1976 | Stork | 74/234 |
| 4,137,787 | 2/1979 | Waugh | 156/139 |

Primary Examiner—Michael W. Ball
Attorney, Agent, or Firm—H. W. Oberg, Jr.; Raymond Fink; Curtis H. Castleman, Jr.

[57] ABSTRACT

A cured and inverted V-belt sleeve having a plurality of spaced circumferential V-grooves that bound oversized V-belt side portions of inverted V-belts is provided by fabricating a belt sleeve with a tensile member interpositioned between inner and outer uncured elastomeric layers, skiving circumferential strips of elastomeric material from the outer layer, and molding and curing the skived belt sleeve. Individual coverless or "raw edge" V-belts or V-belts banded together at their top surfaces are provided with an optional molded circumferential depression that forms an arch in the belt bottom surfaces and juxtaposed embedded reinforcements.

9 Claims, 13 Drawing Figures

PROCESS FOR FORMING V-BELTS AND BELT SLEEVES

BACKGROUND OF THE INVENTION

The invention relates to coverless V-belts having non-molded, or "raw edge" V-sides and a process for their manufacture, but more particularly, the invention relates to a V-belt having non-molded frictional driving surfaces and a process which provides for removing uncured elastomeric material from near the belt V-sides for reprocessing.

V-belts usually fall into two general categories. A covered V-belt is typically manufactured by fabricating a belt sleeve with a tensile member interpositioned between two elastomeric layers, forming V-sides in the belt by skiving away circumferential portions of one of the layers for reprocessing, annularly cutting the sleeve to form a plurality of V-belt bodies, surrounding the belt bodies with a fabric cover strip which may be impregnated with an elastomer, and curing and molding the belts in individual ring molds. Belts in this category are usually quiet running because of the fabric cover. The manufacturing process is economically desirable because the uncured skivings are reprocessable without deleterious affect on the elastomers effectiveness when finally cured.

Belts of the second category are started in a similar manner by fabricating a belt sleeve of principally two elastomeric layers that sandwich a tensile member. However, the entire sleeve is cured and annular bands are severed therefrom to form what is known as coverless or "raw edge" belts. When center cord line belts such as disclosed in U.S. Pat. No. 3,869,933 are manufactured, there is no cured skiving scrap removed between adjacent belts of a sleeve. However, the center cord line belts may not have the power transmitting capability of a "high" cord line belt where the tensile member is placed in the upper portion of the V-belt body.

When high cord line, raw edge belts are manufactured, the material removed between adjacent belts of a sleeve is not directly reprocessable because it has been cured. This is an economic disadvantage to the production of raw edge belts.

Material between adjacent belts of a belt sleeve may be removed by cutting as represented in the above patent, or the material may be removed by grinding as disclosed in U.S. Pat. No. 3,822,516 or U.S. Pat. No. 3,948,113. The raw edge belt shows some appearance advantages over a covered (banded) belt in prolonged use for some drive applications. In a raw edge belt, fibers or several plies of fabric are embedded in the elastomer layers so that portions can be exposed at the V-sides for quiet running. The material should be removed in a manner to expose the fibrous material such as by cutting or grinding. A belt having molded V-sides and no cover is unsatisfactory because a high coefficient of friction at the molded V-sides causes the belt to be aggressive by climbing out of a sheave or to be noisy. Also, the raw edge belt has a disadvantage in that it cannot be molded to some shapes such as the arching shapes of covered belts like disclosed in U.S. Pat. No. 1,988,292.

This invention is directed toward raw edge belts and a manufacturing process which substantially reduces the amount of cured elastomer that must be removed when making high cord line belts.

SUMMARY OF THE INVENTION

In accordance with the invention, high cord line belts and belt sleeves are provided along with a manufacturing process which substantially reduces the amount of cured elastomeric material that must be removed between adjacent belts of a belt sleeve. The belts are characterized by a high cord line, raw edge, V-sidewall driving surfaces, a top surface molded to a substantially cylindrical shape and a bottom surface having a circumferential concave depression and corresponding arching of juxtaposed reinforcements embedded in the belt.

The belt sleeve provided is characterized by a plurality of inverted belts integrally attached to each other at an inverted surface so as to define a sleeve of ganged and partially molded belts, and partially molded, oversized V-surface portions.

The belts and belt sleeve are produced by a process which involves fabricating an inverted belt sleeve with a tensile member interpositioned between an inner and outer layer of generally uncured elastomeric material, skiving circumferential strips of elastomeric material from the sleeve, positioning the sleeve in a mold having a plurality of semi-cavities which correspond with unremoved portions of the outer sleeve layer, molding and curing the sleeve, removing cured elastomeric material from molded V-sidewall portions, and severing belts from the cured belt sleeve.

An advantage of the invention is that raw edge belts are produced by a method which substantially reduces the amount of cured elastomeric material which must be removed to produce a finished V-belt.

Another advantage of the invention is that joined raw edge belts may be produced with substantially reduced cured material wastes.

Another advantage of the invention is that a raw edge belt having an arched undercord and reinforcement may be produced.

A primary object of the invention is to provide a process for manufacturing raw edge V-belts wherein the amount of cured elastomeric material per belt produced is substantially reduced.

These and other objects or advantages of the invention are further explained by the drawings and description thereof wherein.

DESCRIPTION OF PREFERRED EMBODIMENTS

Figure 1:
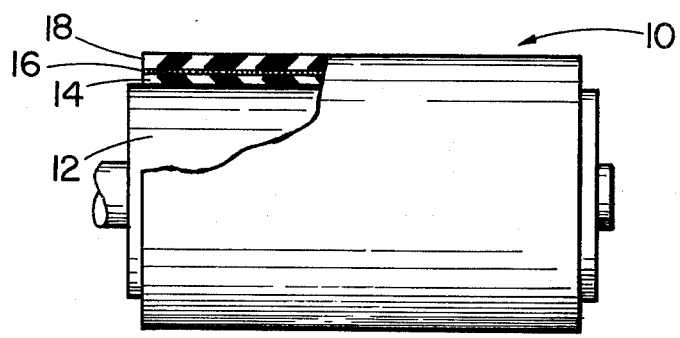
FIG. 1 is a side view of a belt building mandrel and an uncured inverted belt sleeve with a portion broken away.

Referring to FIG. 1, an inverted belt sleeve 10 is fabricated on a mandrel 12 in known fashion. An inner 14 or first layer of generally elastomeric material is positioned around the mandrel followed by the placement of a tensile member 16 such as a spirally wound cord. A second 18 or outer layer of generally uncured elastomeric material is then positioned around the tensile member. The inner and outer layers of uncured elastomeric material sandwich the tensile member. Examples of elastomeric material include the heat curable, natural and synthetic rubbers or blends thereof. The term "generally" is used in describing the elastomeric material as it may include embedded fibrous reinforcement such as discontinuous fibers or discrete layers of fabric as hereinafter illustrated.

Figure 4:
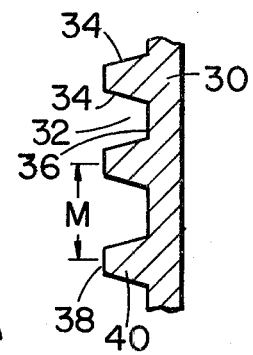
FIG. 4 is a partial view taken along the lines 4—4 of FIG. 3 and showing partial cavities of the shell type mold.

Circumferential strips 20, 22 of uncured elastomeric material are skived from the second layer at axial spacings S of the sleeve. The strips are skived by plunging a contoured knife into a rotating sleeve. The knife contour is preferably chosen to complement the type of mold chosen. For example, a V-type knife 24 may be used to remove a strip of material which has a triangular cross section 20. A truncated V-type knife 26 may be used to skive a strip having a trapezoidal cross section. The differently configured knives are chosen to correspond with the cavity spacing of the chosen mold. For example, the skived belt sleeve portion from the triangular knife may correspond to the mold configuration exemplified by FIG. 6 while a skived portion of the belt sleeve from the truncated knife may correspond to the cavity spacings of the molds exemplified by FIGS. 4 and 5. As in the manufacture with many elastomeric or rubber-type products, care must be taken to control the amount of material skived from the sleeve because it will have an effect on the molding operation. The uncured strips of elastomeric material, which may contain some fibrous reinforcement, are available for reprocessing such as a constituent of the elastomeric layers.

Figure 3:
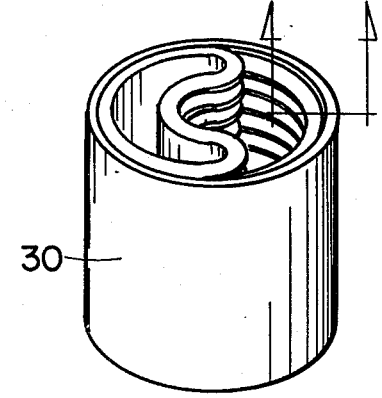
FIG. 3 is an isometric view of a partial cavity, shell type mold showing the manner in which a belt sleeve is placed in or removed from the mold.

A plurality of circumferential grooves 28 are formed in the belt sleeve during the skiving operation. The spacing between grooves S is chosen to match the spacings M of the mold cavity. As illustrated in FIG. 3, a skived belt sleeve is folded inwardly and positioned within a semi-cavity mold 30 so that unremoved portions of the outer layer mesh with the cavities 32. The mold has a plurality of coaxially spaced, annular semi-cavities 32 with conical V-sidewall portions 34 interconnecting a cylindrical bottom surface portion 36. A plurality of mold ribs 38 define the V-side portions and have substantially a trapezoidal cross section 40.

The skived sleeve is molded and cured by pressurizing the sleeve against the mold while simultaneously heating. A known means for applying pressure is by use of a bladder and a known means for heating is by placing the mold into an autoclave for an appropriate period of time.

During molding and curing, overspaced V-sidewall portions 42 are formed as well as a plurality of ganged belts which are circumferentially attached to one another by portions of the inner layer juxtaposed the grooves 28.

Figure 7:
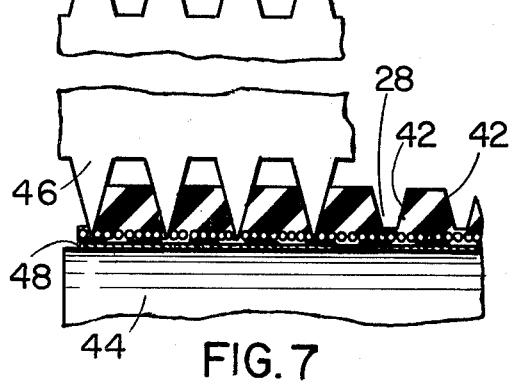
FIG. 7 is a side view of a portion of a supporting drum, a broken away portion of a cured belt sleeve, and a broken view of a grinding wheel removing molded portions from the cured belt sleeve.

Referring to FIG. 7, portions of the overspaced V-sidewalls 42 are removed such as by positioning the cured sleeve over a supporting drum 44 and rotating the sleeve while simultaneously plunging a contoured grinding wheel 46 into the cured sleeve. One preferential grinding step plunges the grinding wheel to a point past the tensile member juxtaposed a surface reinforcement 48 in the inner layer. The amount of elastomeric material removed from the sleeve is illustrated by comparing the portion of the sleeve in FIG. 7 to the molded portion of the sleeve. Stopping the abrading operation at the reinforcement permits molding the belts closer together so that more belts may be molded from a given sleeve.

Figure 8:
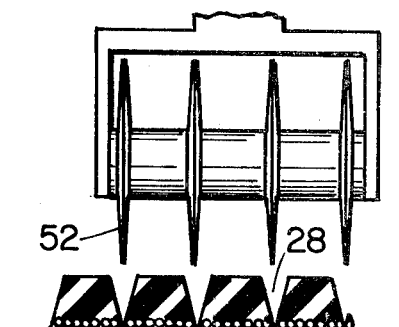
FIG. 8 is a view of a drum, a broken away portion of a belt sleeve with portions of molded V-surfaces removed therefrom, and knives positioned to sever the sleeve to form individual V-belts.
Figure 2:
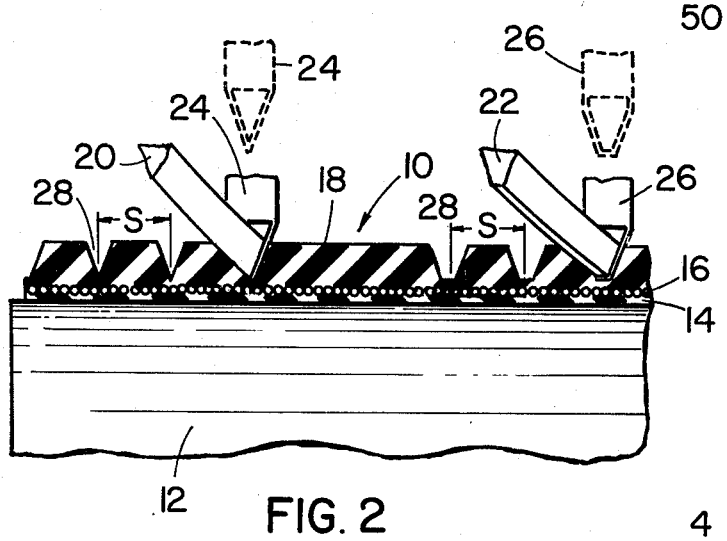
FIG. 2 is an enlarged view similar to FIG. 1 and showing the broken away portion and circumferential strips of uncured elastomeric material skived from the sleeve.

The cured and abraded belt sleeve is circumferentially severed at the grooves such as by rotating the sleeve with a drum 50 and plunging circular knives 52 into the sleeves at the grooves as illustrated by FIG. 8. Severing may also be accomplished during the abrading operation such as by grinding. However, when this is done, the grinding wheel must take away even more of the cured belt slab. The result is a fewer number of belts being produced per cured slab. For this reason, severing with knives is economically preferred even though an additional processing step may be required.

Figure 9:
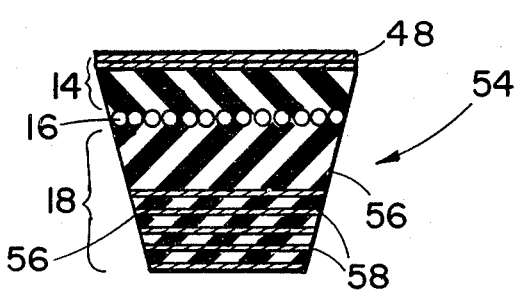
FIG. 9 is a cross section of a V-belt with fabric reinforcement layers embedded therein as made in accordance with the invention using the semi-cavity mold of FIG. 4.

The thus severed belts may then be inverted as illustrated by the belt cross section 54 of FIG. 9. The belt has raw edge V-sidewall portions 56 which define the belt frictional driving surfaces. A plurality of fabric layers 58 embedded in the elastomeric material are exposed at driving surfaces.

Figure 5:
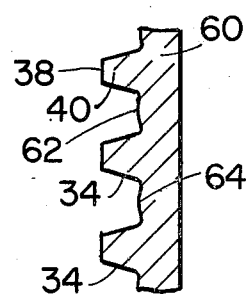
FIGS. 5 and 6 are views similar to FIG. 4 showing examples of other partial mold cavities which may be used.

The process of the invention is adaptable for producing raw edge belts 59 having an arched reinforcement which heretofore have not been produced. The mold 60 of FIG. 5 is used which has an annular convex portion 62 upraised from substantially the entire bottom surface portion in each semi-cavity. The ribs have substantially a chordal cross section 64. During molding, a circumferential concave depression 66 is formed in the exterior of the outer sleeve layer between the successive skived grooves. Molding simultaneously arches at least the fabric layers 68 juxtaposed the concave depression. The exterior surface of the inner layer is simultaneously molded to a substantially cylindrical shape 70. The inner layer forms the belt top surface when the belt is inverted to an upright position.

Figure 11:
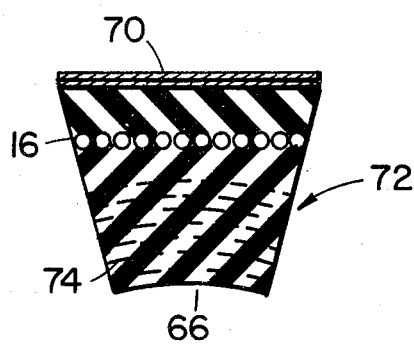
FIG. 11 is a view similar to FIG. 10 but showing a V-belt having a fabric reinforcement embedded in an outer elastomeric layer and a fibrous reinforcement embedded in its inner elastomeric layer.

Similarly, the mold of FIG. 5 may be used advantageously when using an elastomeric layer with discontinuous fiber reinforcement embedded therein as illustrated by the belt cross section 72 of FIG. 11. The molding operation forms a circumferential concave depression 66 in the bottom of the belt, and arching of the fiber reinforcement 74 juxtaposed the bottom surface. As recognized in U.S. Pat. No. 1,988,292 for covered belts, arching provides an improved structure. Arching also aids in the process by helping keep cords of the tensile member in alignment.

Figure 6:
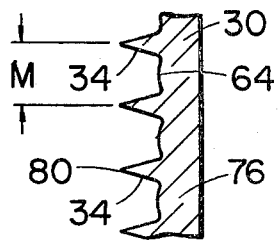
Figure 12:
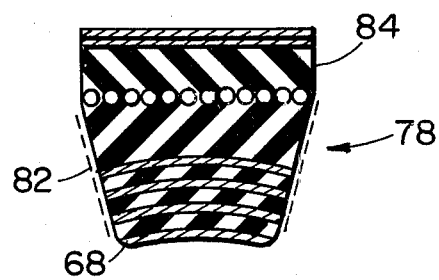
FIG. 12 is a cross sectional view similar to that of FIG. 9 but showing a V-belt produced using the mold of FIG. 6, and also showing in dotted form the outline of molded portions of the V-sides.

If it were desired to remove even less cured material from the molded V-sides, the mold 76 as illustrated by FIG. 6 may be used to produce a belt as represented by the cross section 78 shown in FIG. 12. The spacing between the annular V-grooves of the mold are made closer together as illustrated by the sharp mold ribs 80. Cured material 82 is removed from the V-sides to about the point of the tensile member. The sleeve is then cut which forms a vertical sidewall or flat 84 on the belt sides. The closely spaced mold grooves and the vertical flat permit more belts to be cut from a given belt sleeve. This is because substantially all of the tensile member of the sleeve is used and not ground away as in the previous illustrations. However, such a technique is not recommended for belts having a top width below about 12 millimeters because they may have a tendency to turn over in a sheave groove during operation. Unstability is caused from the elimination of the V-side by the vertical flat.

Figure 10:
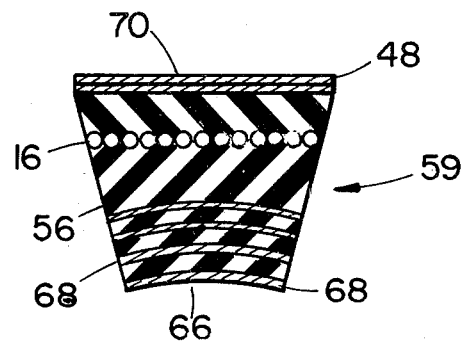
FIG. 10 is a view similar to FIG. 9 but showing a V-belt as cured using the semi-cavity mold of FIG. 5.
Figure 13:
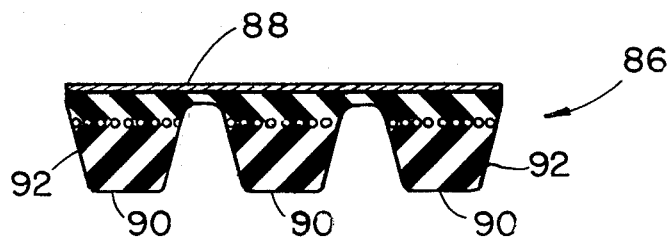
FIG. 13 is a cross-sectional view of a belt produced in accordance with this invention and having three V-portions joined together at the belt top surface.

Still another belt 86 which may be produced by the process of the invention is illustrated by the joined belt cross section of FIG. 13. The belt is produced in a mold with semi-cavities similar to that of FIG. 4 or 5 except that the cavities of the mold are further axially spaced from one another. Of course when this is done, a greater amount of skived material is removed. A grinding wheel formed for the greater spacing may be used to remove material from the molded V-sides. The finished belt has a plurality of joined 88 V-sections 90 with raw edges 92. Optionally the belts may have arched bottom surfaces as shown in FIGS. 10-12.

The foregoing detailed description is made for purpose of illustration only and it is not intended to limit the scope of the invention which is to be determined from the appended claims.

What is claimed is:

1. A process for making V-belts comprising the steps of:
   fabricating an inverted belt sleeve from generally uncured elastomeric material with a tensile member interpositioned between an inner first layer and an outer second layer;
   skiving circumferential strips of uncured elastomeric material from the second layer at axial spacings of the sleeve and forming a plurality of circumferential grooves in the sleeve;
   molding and curing the skived belt sleeve while partially forming inverted V-belts with molded, over-spaced V-side portions, the belts circumferentially attached to one another by portions of the first layer juxtaposed the grooves;
   removing portions of the molded V-sides at the circumferential grooves to define raw V-sidewall portions having predetermined spacing; and
   circumferentially severing the cured belt sleeve juxtaposed at least some of the circumferential grooves thereby forming a plurality of finished V-belts having raw edge V-sidewall portions.

2. The process as claimed in claim 1 wherein the step of severing comprises grinding through the first layer at the circumferential grooves.

3. The process as claimed in claim 1 wherein the step of severing comprises cutting through the first layer at the circumferential grooves.

4. The process as claimed in claim 1 which further includes the steps of:
   placing a plurality of laminate fabric layers in the second layer of the belt sleeve during the step of fabricating;
   removing portions of the fabric layer with the strips of elastomeric material during the step of skiving; and
   molding the exterior surface of the inner first layer to substantially a cylindrical shape and molding a circumferential concave depression in the exterior of the second layer between successive grooves and thereby simultaneously arching at least the fabric layers juxtaposed the concave depression.

5. The process as claimed in claim 1 which further includes the steps of:
   fabricating at least portions of the second layer of the belt sleeve with a fiber-loaded elastomeric material; and
   molding the exterior surface of the first layer to substantially a cylindrical shape and molding a circumferential concave depression in the exterior of the second layer between successive grooves and thereby orienting at least some of the fibers in an arch juxtaposed the concave depression.

6. The process as claimed in claims 1, 2, 3, 4, or 5 which further includes reprocessing the uncured elastomeric strips and using at least portions thereof in fabricating the uncured elastomeric layers.

7. The process as claimed in claims 1, 2, 3, 4 or 5 which further includes the step of forming strips having triangular cross sections during the step of skiving.

8. The process as claimed in claims 1, 2, 3, 4 or 5 which further includes the step of forming strips having trapezoidal cross sections during the step of skiving.

9. The process as claimed in claims 1, 2, 3, 4 or 5 wherein the step of removing comprises abrading portions of the molded V-sidewall portions.

* * * * *